United States Patent [19]

Kim

[11] Patent Number: 5,587,855
[45] Date of Patent: Dec. 24, 1996

[54] SUPPORTING DEVICE FOR MINIMIZING VIBRATION, NOISE AND EXTERNAL IMPACT OF A HARD DISK DRIVE

[75] Inventor: Kwang-Kyu Kim, Seoul, Rep. of Korea

[73] Assignee: SamSung Electronics Co., Ltd., Kyungki-do, Rep. of Korea

[21] Appl. No.: 352,803

[22] Filed: Dec. 1, 1994

[30] Foreign Application Priority Data

Dec. 1, 1993 [KR] Rep. of Korea .................. 26119/1993

[51] Int. Cl.$^6$ .................................................. G11B 33/08
[52] U.S. Cl. .................................................. 360/97.02
[58] Field of Search ........................... 360/97.01–98.01, 360/105, 106

[56] References Cited

U.S. PATENT DOCUMENTS

| | | | |
|---|---|---|---|
| 4,491,888 | 1/1985 | Brown et al. | 360/98.07 |
| 4,598,328 | 7/1986 | Frangesh | 360/106 |
| 4,812,932 | 3/1989 | Hishinuma et al. | 360/97.01 |
| 5,004,207 | 4/1991 | Ishikawa et al. | 360/97.02 |
| 5,021,905 | 6/1991 | Sleger | 360/97.02 |
| 5,081,552 | 1/1992 | Glaser et al. | 360/98.01 |
| 5,187,621 | 2/1993 | Tacklind | 360/97.02 |
| 5,214,549 | 5/1993 | Baker et al. | 360/97.02 |
| 5,235,482 | 8/1993 | Schmitz | 360/97.02 |
| 5,282,100 | 1/1994 | Tacklind et al. | 360/97.02 |

FOREIGN PATENT DOCUMENTS

| | | |
|---|---|---|
| 63-9094 | 1/1988 | Japan. |
| 1-113980 | 5/1989 | Japan. |
| WO88/09551 | 12/1988 | WIPO. |

OTHER PUBLICATIONS

Hewlett Packard Technical Specifications; "HP 97501A—3½ 10 Mbyte Micro–Winchester Disk Drive"; Nov. 1984.

*Primary Examiner*—Jefferson Evans
*Attorney, Agent, or Firm*—Robert E. Bushnell, Esq.

[57] ABSTRACT

The present invention relates to a supporting device for minimizing physical shocks, vibrations and noise of a hard disk drive and more particularly to a hard disk drive in which a supporting device having a damper is installed to protect data recorded on a disk from being lost and to protect the disk or the head from being damaged due to the physical shocks, vibrations and noise. A supporting device for minimizing the physical shocks, vibrations and noise in a hard disk drive having a disk rotating at high speed by the driving of a spindle motor, and a head assembly including an actuator and a magnetic head for writing and reading data recorded in the individual tracks of the disk, and a plate having a substantially same thermal expansion coefficient as that of a base body fixed to the shaft of the spindle motor, a pivot supporting the head assembly, and a damper attached to an upper portion of the plate, for damping the physical shocks, vibrations and noise.

17 Claims, 2 Drawing Sheets

SUPPORTING DEVICE FOR MINIMIZING VIBRATION, NOISE AND EXTERNAL IMPACT OF A HARD DISK DRIVE

CROSS-REFERENCE TO RELATED APPLICATIONS

This application makes reference to, incorporates the same herein, and claims all benefits incurring under 35 USC §119 from an application for *A Supporting Device For Minimizing Vibration, Noise, And External Impact Of A Hard Disk Drive* filed on 1 Dec. 1993 and assigned Ser. No. 1993/26119.

BACKGROUND OF THE INVENTION

1. Technical Field

The present invention relates to a supporting device for minimizing vibration, noise and external impact of a hard disk drive and more particularly to a disk drive assembly in which a supporting device having a damper is installed to protect data recorded on a disk from being lost and to protect the disk or the reading head from being damaged due to physical shocks resulted from external impact as well as vibrations and noise resulted from internal operations of the disk drive.

2. Background Art

As hard disk drives become smaller, and are used in more diverse environments, their ability to withstand physical shocks, vibrations and noise decreases, and consequently, the need to protect the disk drives against physical shocks, vibrations and noise becomes more apparent. Typically, noise arises from the rotation of the spindle motor and the disks, and also from the actuator that supports the read/write heads when a positioning operation is performed. While these are sources of acoustic noise in the typical disk drive, amplification can be caused by the mechanical base and cover. The acoustic noise could ultimately cause errors to arise in head-to-track positioning accuracy, thus limiting data recording densities. Similarly, physical shocks and vibrations from an external source could also cause errors to arise in the head-to-track positioning accuracy, and directly damage the disks which could cause loss of data, and damage to the heads which could end the life of the disk drive life, resulting in a total loss of data. Consequently, resistance to physical shocks, vibrations and noise is critical to protecting the disk, the head and the various bearings in a disk drive from damage. Conventional disk drives designed to reduce physical shocks, vibrations and noise are however, detailed, elaborate, expensive and often ineffective.

For example, U.S. Pat. No. 5,235,482 for *Magnetic Disk Drive Incorporating A Mechanically Damped Base* issued to Schmitz shows a typical design for a magnetic disk drive which reduces vibration and acoustic noise by providing a layer of damping material between a base assembly and a circuit board assembly for damping mechanical resonances. This design however has limited resistance to physical shocks from an external source. Similarly, U.S. Pat. No. 5,021,905 for *Disk Drive Enclosure For Minimizing Stresses And A Vibration Damping Seal therefor* issued to Sleger which envisions a vibration damping seal of a viscoelastic tape to seal a peripheral gap between adjacent base and cover of the hard disk drive in order to damp disk drive vibrations also has limited resistance to physical shocks and vibrations.

Variations on the same theme are shown in U.S. Pat. No. 4,491,888 for *Memory Storage Apparatus Having Vibration-Damped Base Plate Arrangement* issued to Brown et al., and Japanese Laid-Open 63-9094 for *Information Reproducing Device* issued to Inage. In U.S. Pat. No. 4,491,888, Brown discloses a base plate arrangement comprising an annular pad forming an air-tight seal at the edge of the base plate for damping resonant vibrations in the base plate, thereby providing stable servo operation. Similarly, in the Japanese Laid-Open 63-9094, Inage teaches the use of a plurality of springs connected to the inner ceiling of the hard disk drive to prevent vibrations caused from an external source from being transmitted to inner working mechanisms. Both Brown '888 and Inage '094, however, have limited resistance to noise and vibration resulted from the typical disk drive operation.

U.S. Pat. No. 4,598,328 for *Mechanical Damper For Disk Drives Having Band Drive Actuators* issued to Frangesh and U.S. Pat. No. 4,812,932 for *Vibration Proof Supporting Structure For Disk-Type Information Memory Unit* issued to Hishinuma et al., on the other hand, are designed to absorb vibrations of individual mechanical components of the disk drive as opposed to the operation of the entire disk drive itself. That is, Frangest '328 teaches an efficient mechanical damper of a stepper motor for damping unwanted oscillation so that the head of the disk drive could position at a selected data track. Similarly, Hishinuma '932 also teaches an efficient mechanical damper of a head assembly for alleviating the vibration caused by the actuator positioning operation. These conventional designs are however incapable of providing complete protection against physical shocks, vibrations and noise.

A more complete disk drive assembly is disclosed in WO 88/09551 for *Disk Drive Architecture* issued to Stefansky which provides a controlled environment resistant to physical shocks and thermally caused distortion. In Stefansky '551, however, the disk drive architecture is complex and has limited resistance to vibrations from an external source.

SUMMARY OF THE INVENTION

It is therefore an object of the present invention to provide a simple, yet efficient disk drive assembly which is resistant to damages caused by physical shocks, vibrations and noise.

It is another object of the present invention to provide a supporting device of a hard disk drive for protecting data recorded on a disk from being lost and protecting the disk or the head from being damaged due to physical shocks, vibrations and noise.

It is yet another object of the present invention to provide a supporting device of a hard disk drive for ensuring operation stability of a spindle motor and an actuator and thus minimizing positional errors of the head and maximizing head-to-track positioning accuracy.

These and other objects of the invention may be achieved with a simple disk drive assembly comprising a base body having a peripheral portion; at least one disk for storing information; a spindle motor comprising a shaft rigidly secured to the base, for rotating the disk; a head assembly comprising at least one head for reading and writing information to the disk; an actuator assembly comprising a pivot rigidly secured to the base at a position remote from the spindle motor, for supporting the head assembly and positioning the head assembly over individual tracks of the disk; a plate mounted to the shaft of the spindle motor, the pivot of the actuator assembly and the peripheral portion of the base for securing the spindle motor with respect to the actuator assembly and for absorbing physical shocks from an external source and damping acoustic noise caused by disk drive operation; dampers comprising at least three separated and spaced-apart triangular dampers mounted on an upper portion of the plate for damping vibration energy; and a cover for covering the disk, the spindle motor, the head assembly and the head actuator contained in the base body. The plate is designed with triangular shape with each corner portion mounted to the shaft of the spindle motor and the peripheral portion of the base, respectively, and a center portion mounted to the pivot of the actuator assembly and serves as a supporting device for a hard disk drive so as to effectively absorb physical shocks from an external source and damp acoustic noise caused by disk drive operations.

It is contemplated that the plate be made of aluminum having the same thermal expansion coefficient as that of the base body, or alternatively, be made of transparent material for a visual presentation of the inner working mechanisms of the disk drive. Dampers, on the other hand, are made of relatively soft elastomer and should be configured to avoid unnecessary structural rigidity in order to effectively damp the vibrations and noise. According to the invention, the plate with the attached dampers can efficiently protect data recorded on a disk from being lost, protect the disk or the head from being damaged due possibly to physical shocks, vibrations and noise, and minimize positional errors of the head with respect to individual tracks of the disk as well as providing operational stability of a spindle motor and an actuator.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
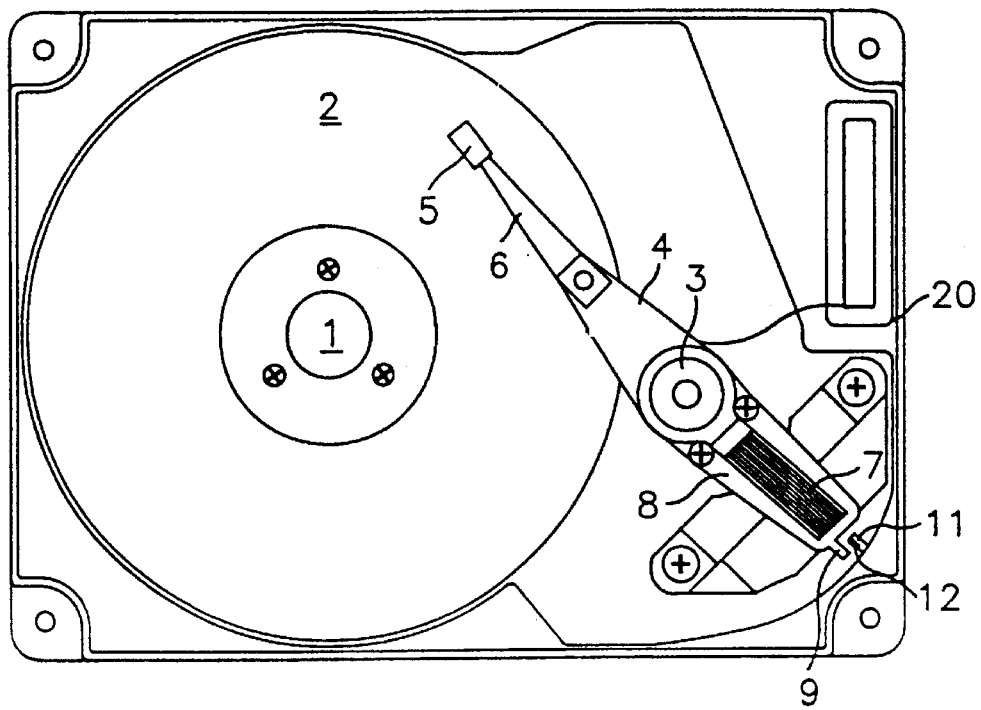
FIG. 1 is a plan view illustrating a conventional hard disk drive.

Referring now to the drawings and particularly to FIG. 1, the hard disk drive (HDD) includes a housing comprised of a base body 20 and a cover 30 (not shown) and a disk 2 which rotates at high speed by a spindle motor 1 and an actuator 4 with a magnetic head 5 for writing and reading data recorded in the disk 2. Both the base body 20 and the cover 30 are fabricated from aluminum or other material that conducts heat rapidly and acts as a heat sink.

The actuator 4 is secured on a base body 20 and is installed to rotate around a pivot 3. As a bobbin 8 installed at one end portion of the actuator 4 moves by the operation of a voice coil motor 7, the magnetic head 5 installed at the other portion of the actuator 4 via a head gimbals 6 moves through the surface of the disk 2, thereby enabling writing and reading data on individual tracks of the disk 2. As the magnetic head 5 moves through the surface of the disk 2, it also maintains a minute interval from the disk 2 because the magnetic head 5 is separated from the surface of the disk 2 by an air current as the disk 2 rotates at high speed.

Upon completion of operation of the hard disk drive or when the power is turned-off, the actuator 4 is positioned on a parking zone located at an inner track of the disk 2 so as to prevent data previously recorded on the disk 2 from being damaged by the contact of the magnetic head 5 with the surface of the disk 2.

In the hard disk drive performing such an operation as mentioned above, the disk 2 rotates at high speed by the spindle motor 1. The head gimbals 6 having the magnetic head 5 for writing and reading data recorded on individual tracks of the disk 2 is attached to the actuator 4. An automatic locking arm 9 of a metal conductor is installed at the outside end of the bobbin 9 secured to the actuator 4, and the middle portion of the actuator 4 is installed to turn left and right on the pivot 3 secured to the base body 20. An automatic locking magnet 12 of a bipolar nature is mounted at a stopper 11 fixed to the base body 20. When the automatic locking arm 9 of the actuator 4 reaches a constant position of the magnet 12 of the stopper 11, the magnet 12 pulls the automatic locking arm 9 and the actuator 4 is secured.

When the hard disk drive reads and writes data, the automatic locking arm 9 of the actuator 4 escapes from the automatic locking magnetic 12 of the stopper 11. However, when the hard disk drive does not operate or a parking command is issued, the automatic locking arm 9 of the actuator 4 is drawn and locked to the automatic locking magnet 12 by an induced electromagnetic force created by the residual current of the voice coil motor 7 secured to the bobbin 8.

In the conventional hard disk drive, however, there is a disadvantage in that the hard disk drive has limited resistance to physical shocks from an external impact, vibrations and noise which leads to the loss of data and damage of the disk and the read/write head of the head assembly because both the spindle motor supporting the disk and the pivot supporting a head assembly are secured to the surface of the base body.

Figure 2:
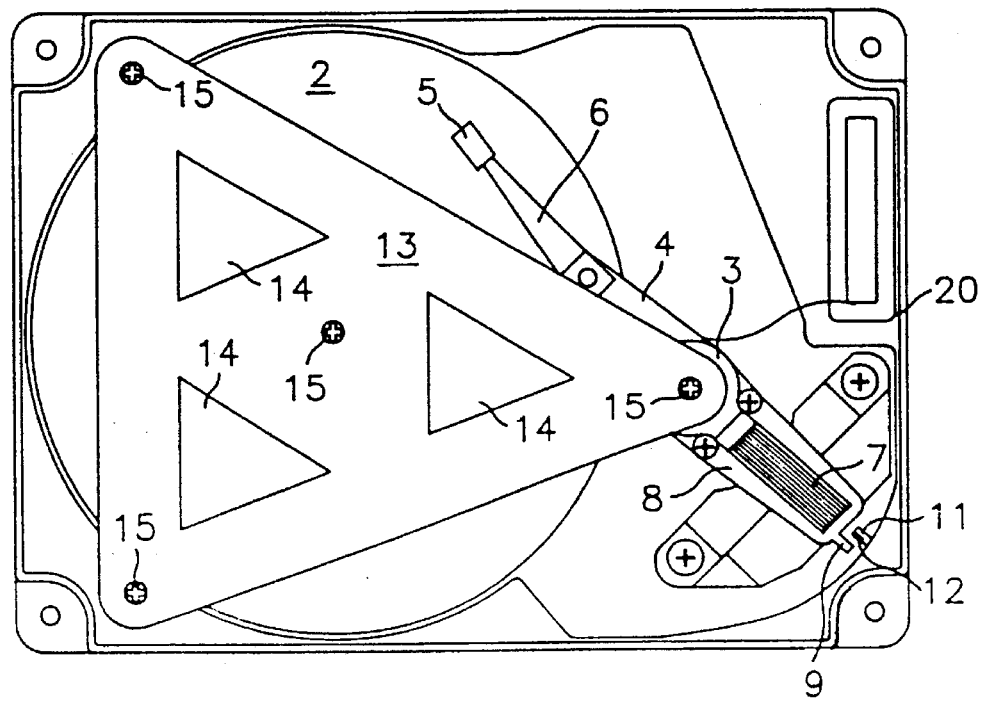
FIG. 2 is a plan view illustrating the hard disk drive according to the present invention.
Figure 3:
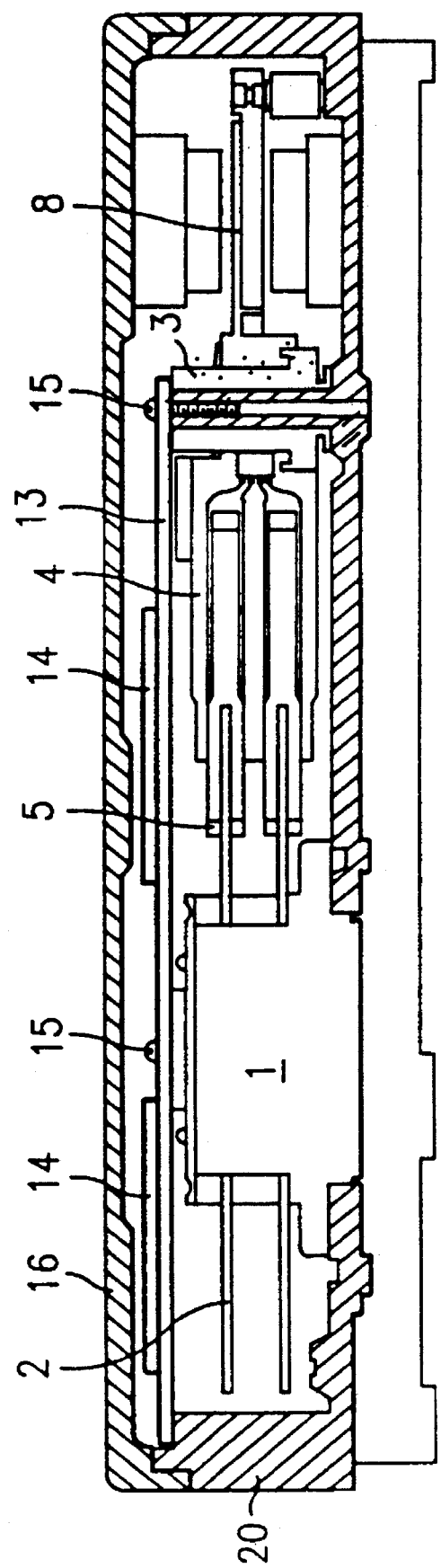
FIG. 3 is a sectional view illustrating the hard disk drive according to the present invention.

Turning now to FIGS. 2 and 3 which illustrate an improved hard disk drive assembly designed to have greater resistance to physical shocks, vibrations and noise according to the present invention. The general operation of the disk drive however remains the same as that of the conventional art. That is, the disk 2 rotates at high speed by the driving of the spindle motor 1, the head assembly having a magnetic head 5 is used for writing and reading data recorded on individual tracks of the disk 2 as the actuator 4 rotates around the pivot 3. In FIGS. 2 and 3, a plate 13 of a triangular shape is used as a supporting device to absorb physical shocks from external impact as well as vibrations and noise resulted from internal operations of the disk drive. The plate 13 is mounted on the shaft of the spindle motor 1, the pivot 3 supporting the head assembly, and base body 20, respectively so as to secure the head assembly in a fixed relation with the disk. A damper 14 is then attached to an upper or lower portion of the plate 13 so as to effectively damp vibrations and external impact of the hard disk drive.

According to the invention, the plate 13 could be mounted on the shaft of the spindle motor 1, the pivot 3, and base body 20 by bolts 15, or alternatively, by adhesive. The plate 13 is fabricated by aluminum having the same thermal expansion coefficient as that of the base body 20. Alternatively, the plate 13 could also be formed by transparent material so as to provide a visual presentation of the inner working mechanisms of the disk drive.

Similarly, the damper 14 comprised of damping material is attached to the upper or lower portion of the plate 13 by either adhesive, or similar means, so as to effectively damp the noise and vibration energy generated from the spindle motor 1. The damping material selected should be material effective for damping noise and vibration such as, for example, rubber or material C-2003-025 produced by E.A.R Corporation. This type of rubber is suitable due to its superior vibration dampening characteristics, while it also has excellent temperature insulation properties.

The operation of the disk drive according to the present invention, as constructed in the above, will be in detail discussed hereafter.

The actuator 4 of the hard disk drive is installed to rotate around the pivot 3. As the bobbin 8 installed at one end portion of the actuator 4 moves by the operation of the voice coil motor 7, the magnetic head 5 installed at the other portion thereof moves through the surface of the disk 2, thereby enabling writing and reading data on individual tracks of the disk 2.

In this case, as the magnetic head 5 moves through the surface of the disk 2, it also maintains a minute interval from the disk 2 because the magnetic head 5 is separated from the surface of the disk 2 by an air current as the disk 2 rotates at high speed.

Upon completion of operation of the hard disk drive or when the power is turned-off, the actuator 4 is positioned on a parking zone located at an inner track of the disk 2 so as to prevent data previously recorded on the disk 2 from being damaged by the contact of the magnetic head 5 with the surface of the disk 2.

The plate 13 and the damper 14, as a supporting device, is installed on the shaft of the spindle motor 1 and the pivot 3 of the head assembly, for effectively damping the physical shocks, vibrations and noise. The damper 14 attached on an upper or lower portion of the plate 13 should be formed from a relatively soft elastomer and should be configured to avoid unnecessary structural rigidity in order to effectively damp and reduce the vibration, noise and external impact. Energy absorbing rubber such as #C-2003-025 produced by E.A.R Corporation is an example of a suitable material for the damper.

The plate 13 is either an aluminum metal plate having the same thermal expansion coefficient as that of the base body 20, or a transparent plate of transparent material, to which one to three dampers are attached. One advantage of using the plate 13 of transparent material is that when a cover 16 is open, a user can see the internal working mechanism and the location of the various mechanical components, such as the disk 2 and the actuator 4 of the disk drive through the plate 13.

Also, as mentioned earlier, the plate 13 is mounted on the shaft of the spindle motor 1, the pivot 3, and base body 20, respectively, by either bolts 15, or alternatively, by adhesive. When the plate 13 and the damper 14 is mounted as shown in FIGS. 2 and 3 of the invention, the noise and vibration generated internally in the hard disk drive is reduced. Also, when the external vibration and impact occur, the magnitude of the vibration and impact is alleviated by the damper 14 of the plate 13, thereby protecting data recorded on individual tracks of the disk from being lost as well as protecting the disk or head from being damaged.

The reason that the center portion of the triangular plate 13 is fixed to the shaft of the spindle motor 1 by bolt 15 is that it serves to secure the spindle motor 1 over and below, so that the running-out or vibration and impact of the disk 2 can be reduced. Similarly, the fixation of the pivot 3 and the triangular plate 13 by bolt 15 serves to firmly support the head assembly, and the attachment of the base body 20 and the plate 13 by either bolt 15 or adhesive serves to damp external impact and vibration by the damper 14 through the plate 13.

As mentioned earlier also, the main vibration source of the hard disk drive is caused from the spindle motor 1 and actuator 4. In order to reduce the position errors of the head which lead to the erroneous reading and writing of data on individual tracks of the disk because of the relative noise and vibration caused by the spindle motor 1 and actuator 4, the plate 13 with the damper 14 is fixed to the shaft of the spindle motor 1 and the pivot 3 of the actuator 4 and thereby the noise and vibration thereof is damped by the damper 14 attached by adhesive on the plate 13. As discussed above, by reducing the vibration energy generated from the spindle motor 1 and actuator 4, the position errors of the head can be reduced while ensuring the operational stability of the spindle motor 1 and actuator 4.

As mentioned above, in accordance with the present invention, since the plate 13 with the damper 14 is mounted on the shaft of the spindle motor 1, the pivot 3, and base body 20, respectively, the noise, vibration and generated in the spindle motor 1 and actuator 4 of the hard disk drive and physical shocks from external impact are reduced, thereby protecting data previously recorded on individual tracks of the disk from being lost and the disk or head from being damaged.

While preferred embodiments of the invention have been particularly shown and described, it will be understood by those skilled in the art that foregoing and other changes in form and details may be made without departing from the spirit and scope of the invention as defined in the appended claims, and that it may be possible, for example, to define the plate and dampers with different materials having similar damping characteristics. Furthermore, the principles of the invention are also directly applicable to optical disk drive.

What is claimed is:

1. A disk drive comprising:

a spindle motor;

a disk rotatably mounted upon said spindle motor;

a body providing a base accommodating rotation of said disk while said disk is driven by said spindle motor;

a pivot mounted upon said body;

a head assembly mounted rotatably mounted upon said pivot, said head assembly including an actuator and a magnetic head for writing and reading data recorded on said disk as said head assembly rotates about said pivot;

a cover enclosing said disk within said body;

a plate discrete and spaced apart from the cover, said plate being interposed between the cover and said head assembly, said plate having a thermal coefficient of expansion substantially the same as that of said body, said plate having a center portion attached to a shaft of said spindle motor and a plurality of peripheral portions separately extending from said center portion to said pivot of said head assembly and to a plurality of spaced-apart locations mutually separated from each other by said disk and from said pivot by said disk;

means for individually attaching each of said peripheral portions to said body; and damper means disposed between said cover and said head assembly, said damper means being attached to one of an upper portion and a lower portion of said plate, for damping generation of said vibration, noise and external impact.

2. The disk drive of claim 1, wherein said plate is fixed to the shaft of said spindle motor, said pivot and said base, respectively by threaded fasteners.

3. The disk drive of claim 2, wherein said plate comprises a triangular shape.

4. The disk drive of claim 1, wherein said plate is fixed to a shaft of said spindle motor and said pivot by threaded fasteners, and to said base body by said attaching means.

5. The disk drive of claim 1, wherein said damper means is comprised of damping material and is attached to one of the upper portion and the lower portion of said plate by adhesive.

6. The disk drive of claim 5, wherein said damping material of said damper means is rubber.

7. The disk drive of claim 5, further comprised of said damper means comprising at least three discrete, separate and spaced-apart dampers each attached on the upper surface of said plate.

8. A disk drive comprising:

a spindle motor having a shaft;

a disk rotatably mounted upon said spindle motor;

a body providing a base accommodating rotation of said disk while said disk is driven by said spindle motor;

a pivot mounted upon said body;

a head assembly mounted rotatably mounted upon said pivot, said head assembly including an actuator and a magnetic head for writing and reading data recorded on said disk as said head assembly rotates about said pivot;

a cover enclosing said disk within said body;

a plate of transparent material positioned between said cover and said head assembly, said plate having a center portion attached to said shaft of said spindle motor and plurality of peripheral portions separately extending from said center portion to said pivot of said head assembly and to a plurality of spaced-apart locations mutually separated from each other by said disk and from said pivot by said disk;

means for attaching each of said peripheral portions to said body; and a damper attached to said plate, for damping generation of said vibration, noise and external impact.

9. The disk drive of claim 8, further comprised of said plate being a triangularly shaped plate, and said triangularly shaped plate having each corner fixed to the pivot of said head assembly and the peripheral regions of said base, respectively, and a center mounted upon and secured to the shaft of said spindle motor separated from the pivot by the disk.

10. The disk drive of claim 8, further comprised of said plate exhibiting a triangular shape and having a first corner fixed to the pivot of said head assembly, said center portion fixed to the shaft of said spindle motor by threaded fasteners, and second and third corners each fixed to different ones of said locations by said attaching means.

11. The disk drive of claim 8, further comprised of said damper comprising damping material fixed to an upper portion of said plate by adhesive for effectively damping vibration energy.

12. The disk drive of claim 11, wherein said damping material of said damper is rubber.

13. The disk drive of claim 11, further comprised of said damper comprising at least three discrete, separate and spaced-apart dampers each attached on the upper portion of said plate having a triangular shape.

14. A disk drive apparatus, comprising:

a base having a peripheral portion;

at least one disk for storing information on a surface of said disk;

a spindle motor comprising a shaft rigidly secured to said base, for rotating the disk;

a head assembly comprising at least one head for reading and writing information from said surface of said disk;

an actuator assembly comprising a pivot rigidly secured to said base at a position remote from said spindle motor, for supporting the head assembly and positioning the head assembly over individual tracks of said disk;

a triangularly shaped plate comprising damper means for damping vibration, noise and external impact, said triangularly shaped plate having a central portion mounted upon and attached to the shaft of said spindle motor, a first corner mounted upon and attached to the pivot of said actuator assembly and second and third corners mounted upon and attached to the peripheral portion of said base to secure said shaft of said spindle motor with respect to said pivot of said actuator assembly, said first corner being spaced-apart and separated from said second and said third corners by said surface, and said second corner being separated and spaced-apart from said third corner by said surface; and a cover spaced apart from said plate, said cover being separated by said plate from said disk and said head assembly, said cover for encasing the disk, the spindle motor, the head assembly, the head actuator and said triangularly shaped plate between said cover and said base.

15. The disk drive apparatus as claimed in claim 14, further comprised of said damper means being positioned between said cover and said plate, being separated by the disk by the triangularly shaped plate, and being mounted on a lower portion of said triangularly shaped plate by adhesive for damping vibration energy.

16. The disk drive apparatus as claimed in claim 14, further comprised of said damper means being positioned between said cover and said plate, being separated by the disk by the triangularly shaped plate, and being mounted on an upper portion of said triangularly shaped plate by adhesive for damping vibration energy.

17. The disk drive apparatus as claimed in claim 14, further comprised of said damper means comprising a plurality of discrete dampers each mounted on an upper portion of said triangularly shaped plate, and spaced apart in a array symmetrically disposed between included angles of said triangularly shaped plate and the shaft of said spindle motor.

* * * * *